(12) United States Patent
Lee et al.

(10) Patent No.: US 7,519,354 B2
(45) Date of Patent: Apr. 14, 2009

(54) DYNAMIC AUTHENTICATION CONFIGURATION IN A NETWORK

(75) Inventors: Bo Lee, Alpharetta, GA (US); Scott Easley, Cumming, GA (US); Rickie T. Taylor, Spring Valley, NY (US); Fredrik Andersson, Plano, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 341 days.

(21) Appl. No.: 11/300,695

(22) Filed: Dec. 15, 2005

(65) Prior Publication Data

US 2007/0142031 A1    Jun. 21, 2007

(51) Int. Cl.
*H04M 3/16* (2006.01)

(52) U.S. Cl. ............... 455/411; 455/433; 455/432.1; 455/453; 455/435.1; 713/168

(58) Field of Classification Search ........... 455/411, 455/410, 453; 713/168
See application file for complete search history.

(56) References Cited

U.S. PATENT DOCUMENTS

| | | | |
|---|---|---|---|
| 5,661,807 A | | 8/1997 | Guski et al. |
| 6,138,016 A | * | 10/2000 | Kulkarni et al. ............ 455/433 |
| 6,148,197 A | * | 11/2000 | Bridges et al. ........... 455/432.3 |
| 6,148,200 A | * | 11/2000 | Lahtinen ................... 455/433 |
| 6,169,892 B1 | * | 1/2001 | Sollee ....................... 455/411 |
| 6,314,291 B1 | * | 11/2001 | Fujimichi .................. 455/433 |
| 6,360,096 B1 | * | 3/2002 | Charpentier et al. ........ 455/433 |
| 6,434,713 B1 | * | 8/2002 | Shin et al. .................... 714/25 |
| 6,463,286 B1 | * | 10/2002 | Salminen ................... 455/453 |
| 6,631,270 B1 | * | 10/2003 | Dolan ........................ 455/453 |
| 7,039,402 B1 | * | 5/2006 | Gan et al. ................... 455/433 |
| 7,206,593 B1 | * | 4/2007 | Yarkosky et al. ........... 455/517 |
| 7,224,971 B2 | * | 5/2007 | Noguchi et al. .......... 455/435.1 |
| 2002/0034949 A1 | * | 3/2002 | Hoff et al. .................. 455/445 |
| 2003/0027571 A1 | * | 2/2003 | Karlsson et al. ............ 455/433 |
| 2003/0126435 A1 | * | 7/2003 | Mizell et al. ................ 713/168 |
| 2005/0166263 A1 | | 7/2005 | Nanopoulos et al. |

FOREIGN PATENT DOCUMENTS

EP    1469698    10/2004

OTHER PUBLICATIONS

Universal Mobile Telecommunications System (UMTS); 3G security; Security architecture (3GPP TS 33.102 version 6.4.0 Release 6), ETSI Standards, European Telecommunications Standards Institute, Sophia-Antipo, FR vol. 3-SA3, No. V640, Sep. 2005, pp. 1-63.
Search Report dated Aug. 27, 2007 (Application No. PCT/US2006/043960).
Search Report dated May 18, 2007 (Application No. PCT/US2006/043960).

* cited by examiner

*Primary Examiner*—Charles N Appiah
*Assistant Examiner*—Kwasi Karikari
(74) *Attorney, Agent, or Firm*—Zagorin O'Brien Graham LLP

(57) ABSTRACT

A method of dynamic authentication configuration adjusts authentication configuration according to traffic patterns within a system, such as a cellular communications network. In a network, mobile devices are authenticated based on various events, such as an attach, location update, originated call, etc. According to a first embodiment, one or more authentication configuration profiles is defined for a VLR/SGSN and a time schedule/table to automatically update the authentication configurations based on a time. Accordingly, the number of authentications for a particular VLR is reduced as signaling traffic increases, and vice versa. In another exemplary embodiment, an HLR monitors system level traffic load to command each VLR and SGSN to change the authentication configurations. Authentication operations are preferably configured on per node and per traffic pattern basis.

16 Claims, 7 Drawing Sheets

DYNAMIC AUTHENTICATION CONFIGURATION IN A NETWORK

FIELD OF THE INVENTION

The present invention is directed to configuring network authentication. In particular, the present invention is directed to a system for providing dynamic authentication configuration information to determine how and when a device is authenticated by the network.

BACKGROUND OF THE INVENTION

Global system for mobile communication (GSM) is one of the most widely wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Authenticating a subscriber's mobile station/handset is desirable because it helps to prevent fraudulent use of an operator's network. However, authentication of mobile stations uses network resources and may create a high system load at peak times. The authentication traffic, however, does not produce any revenue for the operator. Thus, it would be desirable if authentication configuration could be dynamically changed based on call volume, times of day, etc., while maintaining an acceptable level of security.

SUMMARY OF THE INVENTION

A method of dynamic authentication configuration adjusts an authentication configuration according to traffic patterns within a system, such as a cellular communications network. In a network, mobile devices are authenticated based on various events, such as an attach, location update, originated call, etc. According to a first embodiment, one or more authentication configuration profiles is defined for a VLR/SGSN and a time schedule/table to automatically update the authentication configurations based on a time. Accordingly, the number of authentications for a particular VLR is reduced as signaling traffic increases, and vice versa. In another exemplary embodiment, an HLR monitors system level traffic load to command each VLR and SGSN to change the authentication configurations. Authentication operations are preferably configured on per node and per traffic pattern basis. In yet another embodiment, authentication is performed based on a class of service to which a particular customer may subscribe.

These and other features of the invention will be described in greater detail below.

DETAILED DESCRIPTION OF ILLUSTRATIVE EMBODIMENTS

Figure 1:
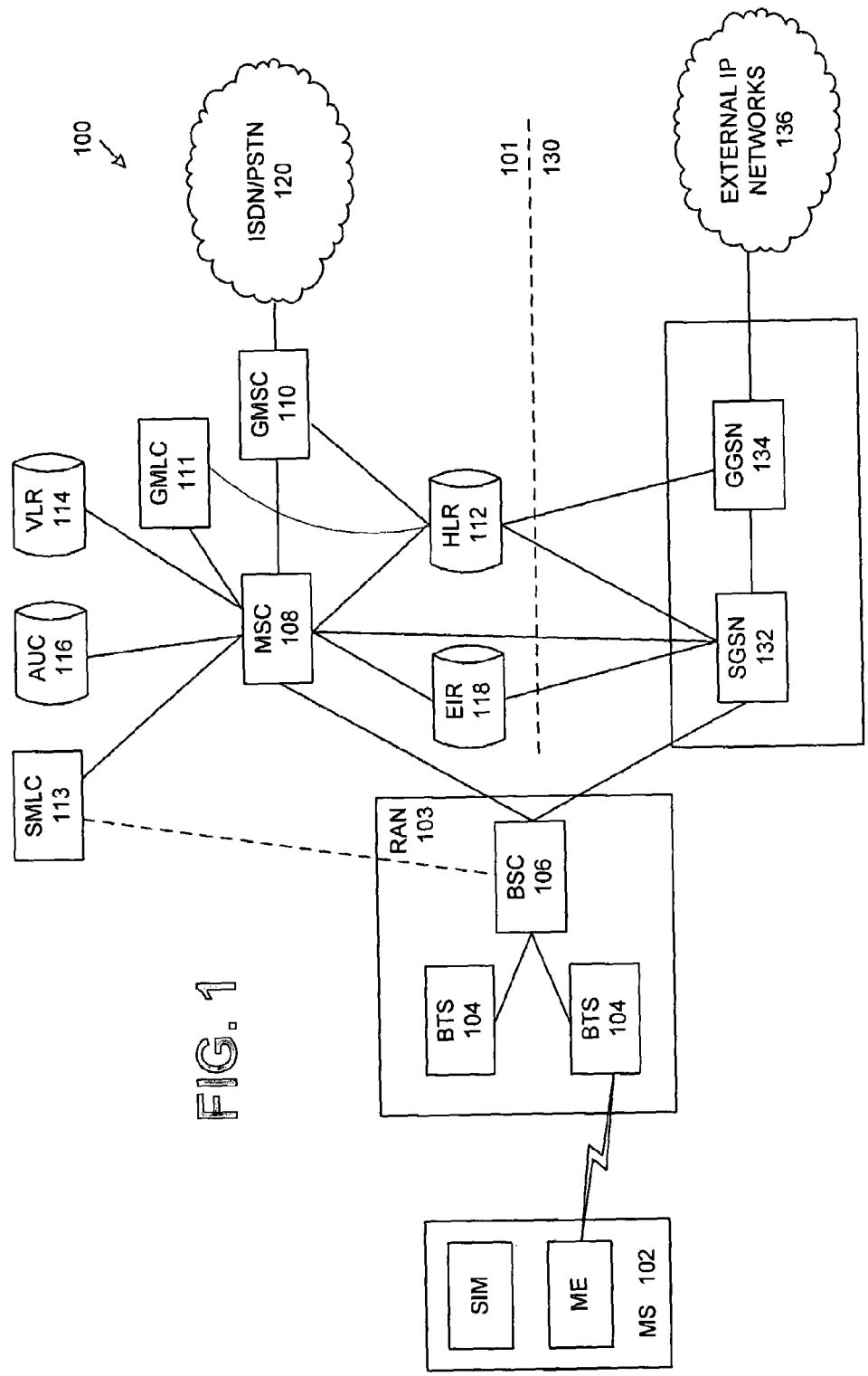
FIG. 1 is an overview of an exemplary wireless communication environment.

FIG. 1 shows a GSM/GPRS network architecture 100 that includes a GSM core network 101 and a GPRS network 130. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR 114 contains information necessary for call control and provision of subscribed services for each MS currently located in a geographical area controlled by the VLR 114. The HLR 112 and the VLR 114, together with the MSC 108, provide the call routing and roaming capabilities of GSM. The VLR 114 may reside on the same platform as the MSC 108 or the GMSC 110 or a call server. The AuC 116 provides the parameters needed for authentication and encryption functions. Such parameters allow verification of a subscriber's identity. The EIR 118 stores security-sensitive information about the mobile equipment.

Location services (LCS) are provided by a Gateway Mobile Location Center (GMLC) 111 and/or a Serving Mobile Location Center (SMLC) 113. The GMLC 111 may request routing information from the HLR 112 and send positioning requests to either the Visited Mobile Switching Centre (VMSC, not shown), a Serving GPRS Support Node (SGSN 132) or MSC 108, and receives final location estimates from the corresponding entity.

The SMLC 113 is either a separate network element or an integrated functionality in the BSC 106. The SMLC manages the overall coordination and scheduling of resources required for the location of a MS 102. The SMLC 1113 also calculates the final location estimate and estimates the achieved accuracy. The SMLC 113 may control a number of Location Measurement Unit (LMU) for the purpose of obtaining radio interface measurements to locate or help locate MS subscribers in the area that it serves.

To gain access to GSM services, such as speech, data, and short message service (SMS), the MS first registers with the network to indicate its current location by performing a location update and IMSI attach procedure. The MS 102 sends a location update including its current location information to the MSC 108/VLR 114, via the BTS 104 and the BSC 106. The location information is then sent to the MS's HLR 112. The HLR 112 is updated with the location information received from the MSC 108/VLR 114. The location update also is performed when the MS moves to a new location area. Typically, the location update is periodically performed to update the database as location updating events occur.

The GPRS network 130 is logically implemented on the GSM core network architecture by introducing two packet-switching network nodes, the serving GPRS support node (SGSN) 132 and a Gateway GPRS support node (GGSN) 134. The SGSN 132 is at the same hierarchical level as the MSC 108 in the GSM network. The SGSN 132 controls the connection between the GPRS network and the MS 102. The SGSN 132 also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN 132. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN 132, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictate a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

Figure 2:
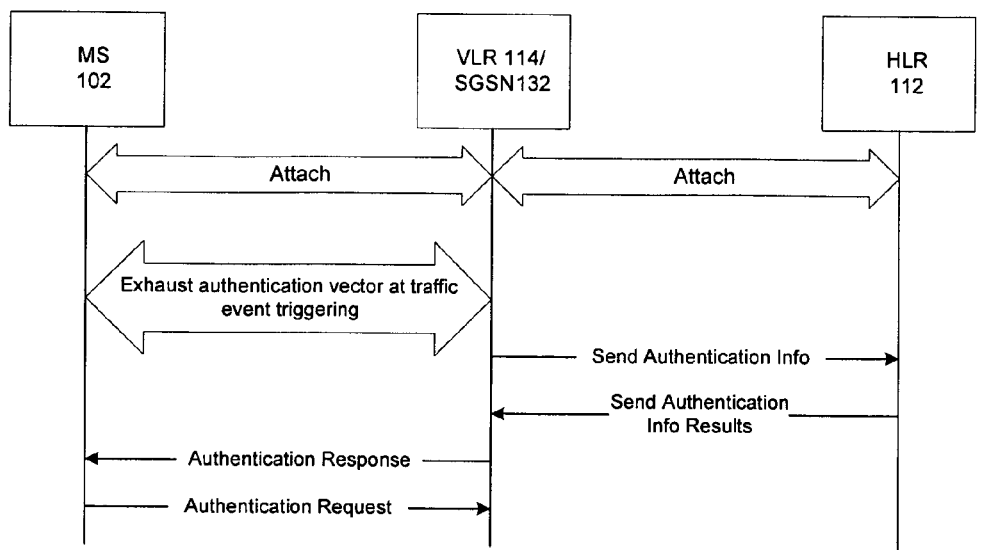
FIG. 2 illustrates an authentication procedure where a Visitor Location Register (VLR)/Serving GPRS Support Node (SGSN) request and receive authentication vectors from an HLR.
Figure 3:
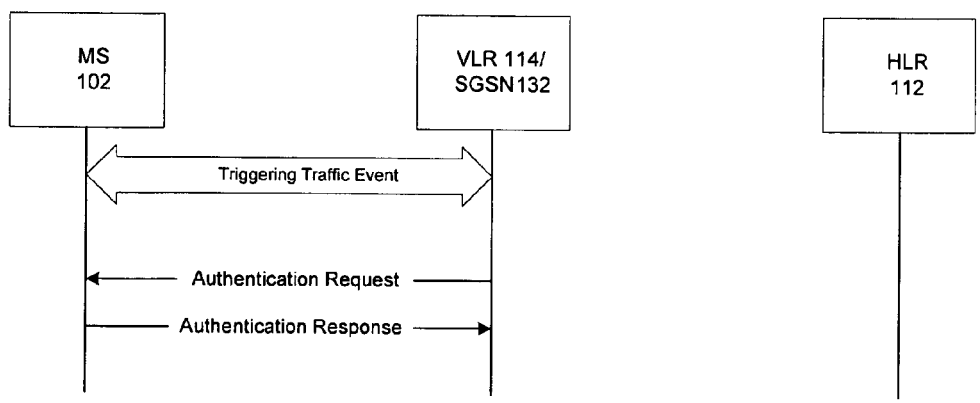
FIG. 3 illustrates an authentication procedure where the VLR/SGSN do not request and receive authentication vectors from Home Location Register (HLR)

FIGS. 2-3 illustrate exemplary authentication processes used in GSM and Universal Mobile Telecommunications Systems (UMTS). Authentication can be selectively invoked with predefined occurrences for specific traffic events through parameter settings. Such events include: International Mobile Subscriber Identity (IMSI) attachments, location updates, routing area updates, normal calls, and bearer service requests, etc., as configured by the network operator. Once specified, these parameter settings are applicable to all subscribers served by a VLR 114 or a SGSN 132.

As shown in FIG. 2, for authentication following the first attach, a VLR 114 or a SGSN 132 requests one to five authentication vectors from the HLR 112. As shown in FIG. 3, if the VLR 114 and the SGSN 132 are configured to request more than one vector and to use all of the authentication vectors, they will not need to request and receive new authentication vectors from the HLR 112 until there are no unused vectors remaining.

Authentication provides protection to a wireless network by providing secure wireless services. The description of authentication described above is applicable to GSM/GPRS/UMTS systems. However, as noted above, authentication will also increase signaling traffic, which consumes network resources. Conventionally, most authentication procedures are invoked by statically configured thresholds. During busy hours, non-revenue generating authentication processes compete with other revenue generating traffic handling processes. During non-busy hours, authentication processes generally consume idling network resources and do not compete with traffic handling processes.

The present invention improves upon handling of authentication to improve an operator's return on operations while minimizing fraud and the impact to network capacity. For greatest effectiveness, authentication operations are preferably configured on per node and per traffic pattern basis. In particular, solutions that adjust authentication configuration according to traffic patterns within a system provide an advantageous solution. A first exemplary embodiment allows an operator to define an authentication configuration profile for each VLR 114 and SGSN 132 and a time schedule/table for each node to automatically update the authentication configurations. Another exemplary embodiment enables the HLR 112 to monitor system level traffic load to command each VLR 114 and SGSN 132 to change the authentication configurations.

Figure 4:
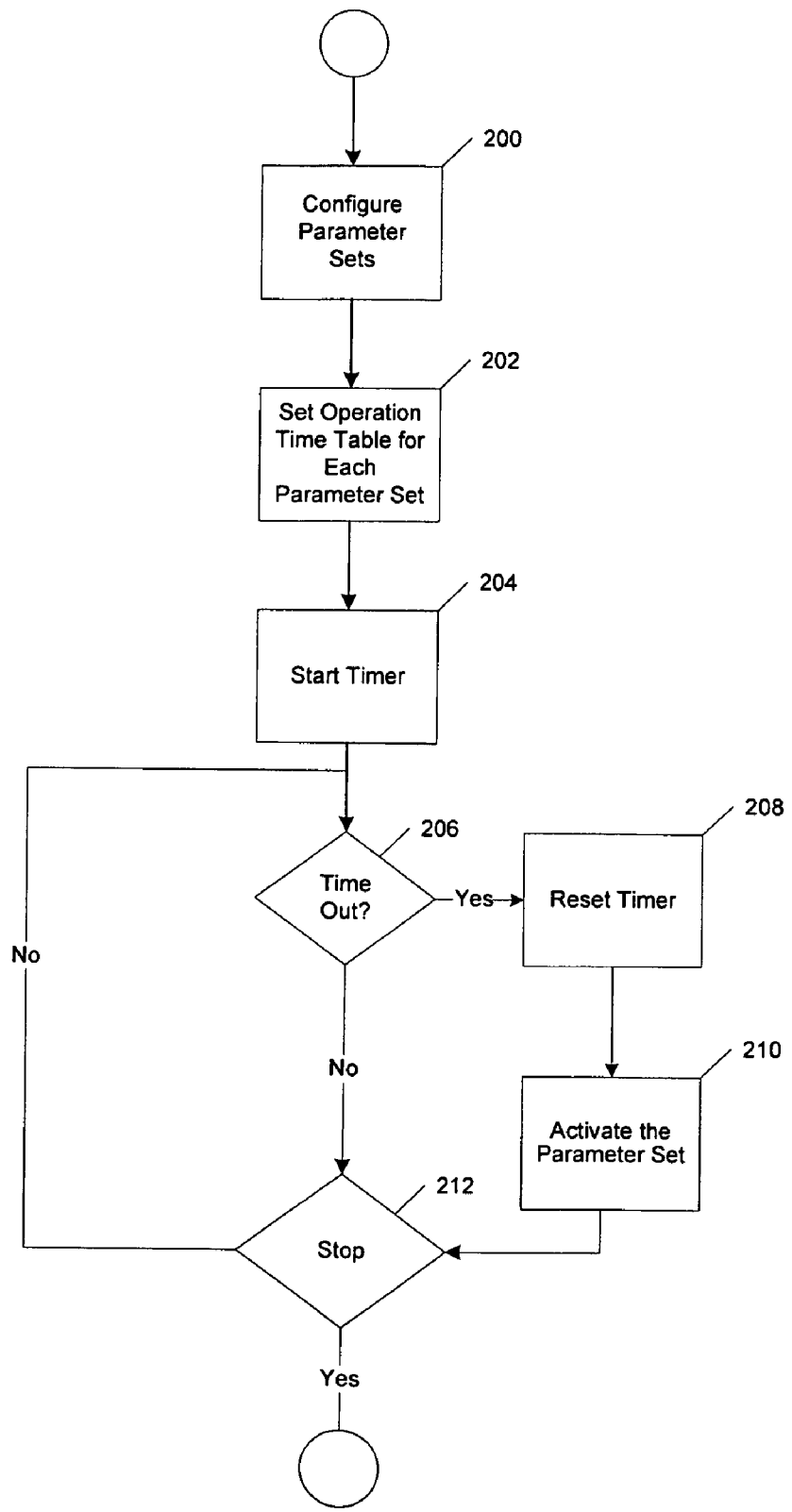
FIG. 4 is a flowchart of exemplary processes performed in accordance with an embodiment of present invention.

Referring to FIG. 4, the first embodiment provides sets of authentication parameters that are predefined for low signaling traffic, medium signaling traffic and high signaling traffic (200). The exemplary Parameter Sets are shown in Tables 1 and 2 below. An exemplary time table is predefined for each VLR 114 and SGSN 132 where the sets are active (202).

TIME TABLE 1

| | Time 1 (Off Peak 1) | Time 2 (Peak 1) | Time 3 (Off Peak 2) | Time 4 (Peak 2) |
|---|---|---|---|---|
| Time Variable Parameter Set | (8:00 pm-6:00 am) 1 | (6:00 am-10:00 am) 2 | (10:00 am-3:00 pm) 1 | (3:00 pm-8:00 pm) 2 |

Each segment in the time table is associated with a set of the predefined parameters as shown in Tables 1 and 2. For example, the low signaling traffic time period is associated with Parameter Set 1; the medium signaling traffic period is associated with Parameter Set 2; and the high signaling traffic period is associated with Parameter Set 3.

A timer is started (204) and after it times-out (206) it is reset (208) and the appropriate parameter set for the time period is activated (210). As such, the set of parameters is automatically activated when its operation time arrives. Next, it is determined if the process should stop (212). If so, the process stops; otherwise it returns to (206) to wait for the timer time-out.

TABLE 1

Parameter Set for VLR 114

| Parameter Set 1 | | Parameter Set 2 | | Parameter Set 3 | |
|---|---|---|---|---|---|
| Traffic Event | Threshold for Event Counter | Traffic Event | Threshold for Event Counter | Traffic Event | Threshold for Event Counter |
| Attach | 1 | Attach | 1 | Attach | 1 |
| Normal Location Update | 20 | Normal Location Update | 50 | Normal Location Update | 0 |
| Periodic Location Update | 20 | Periodic Location Update | 250 | Periodic Location Update | 0 |
| Mobile-Originated Call | 20 | Mobile-Originated Call | 50 | Mobile-Originated Call | 0 |
| Mobile-Originated SMS | 20 | Mobile-Originated SMS | 0 | Mobile-Originated SMS | 0 |
| Mobile-Terminated Call | 20 | Mobile-Terminated Call | 50 | Mobile-Terminated Call | 0 |
| Mobile-Terminated SMS | 20 | Mobile-Terminated SMS | 0 | Mobile-Terminated SMS | 0 |
| Mobile-Terminated USSD | 20 | Mobile-Terminated USSD | 0 | Mobile-Terminated USSD | 0 |
| Mobile Location Service | 20 | Mobile Location Service | 0 | Mobile Location Service | 0 |
| Supplementary Service Operation | 20 | Supplementary Service Operation | 0 | Supplementary Service Operation | 0 |

TABLE 2

Parameter Set for SGSN 132

| Parameter Set 1 | | Parameter Set 2 | | Parameter Set 3 | |
|---|---|---|---|---|---|
| Traffic Event | Threshold for Event Counter | Traffic Event | Threshold for Event Counter | Traffic Event | Threshold for Event Counter |
| Attach | 1 | Attach | 1 | Attach | 1 |
| Normal RA Update | 30 | Normal RA Update | 70 | Normal RA Update | 0 |
| Periodic RA Update | 30 | Periodic RA Update | 250 | Periodic RA Update | 0 |
| Mobile-Originated PDP Context Activation | 30 | Mobile-Originated PDP Context Activation | 50 | Mobile-Originated PDP Context Activation | 0 |
| Mobile-Originated PDP Context Deactivation | 30 | Mobile-Originated PDP Context Deactivation | 70 | Mobile-Originated PDP Context Deactivation | 0 |
| Mobile-Initiated PDP Modification | 30 | Mobile-Initiated PDP Modification | 70 | Mobile-Initiated PDP Modification | 0 |

TABLE 2-continued

Parameter Set for SGSN 132

| Parameter Set 1 | | Parameter Set 2 | | Parameter Set 3 | |
| --- | --- | --- | --- | --- | --- |
| Traffic Event | Threshold for Event Counter | Traffic Event | Threshold for Event Counter | Traffic Event | Threshold for Event Counter |
| Mobile-Originated SMS | 30 | Mobile-Originated SMS | 70 | Mobile-Originated SMS | 0 |
| Mobile-Terminated SMS | 30 | Mobile-Terminated SMS | 70 | Mobile-Terminated SMS | 0 |
| GPRS Detach | 30 | GPRS Detach | 0 | GPRS Detach | 0 |

The first embodiment above can be advantageously implemented in conventional GSM networks 100 without any changes to existing protocols. Each network operator may implement the Parameter Sets in a manner suitable for that operator at time periods that reflect signaling loads in systems on a local, regional or national basis.

Figure 5:
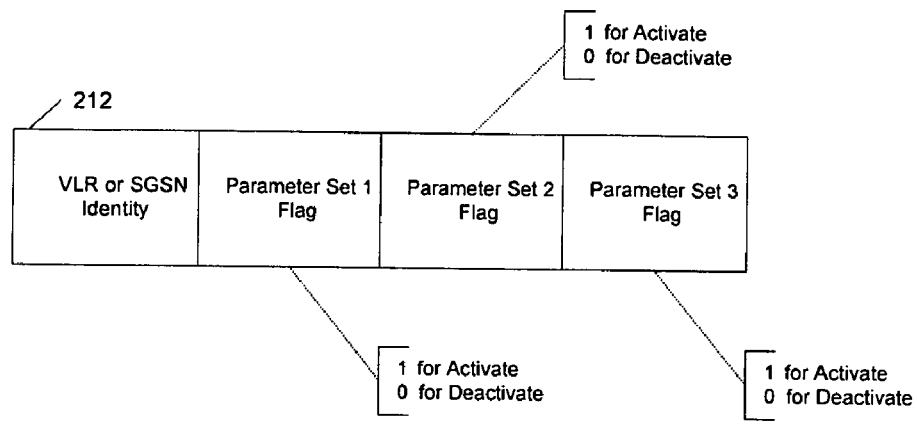
FIGS. 5 and 6 are exemplary messages passed between an HLR and a VLR/SGSN.
Figure 6:
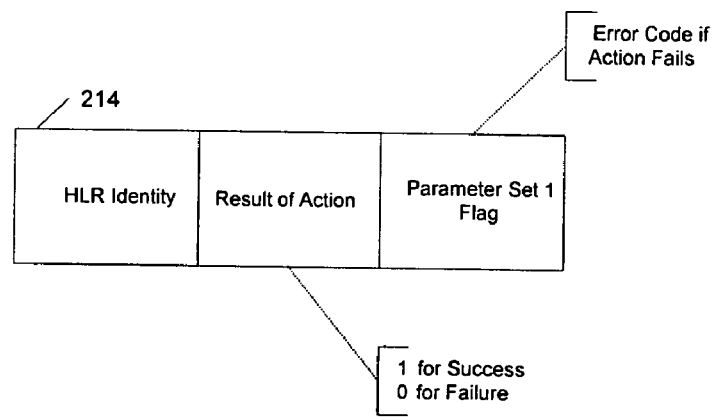
Figure 7:
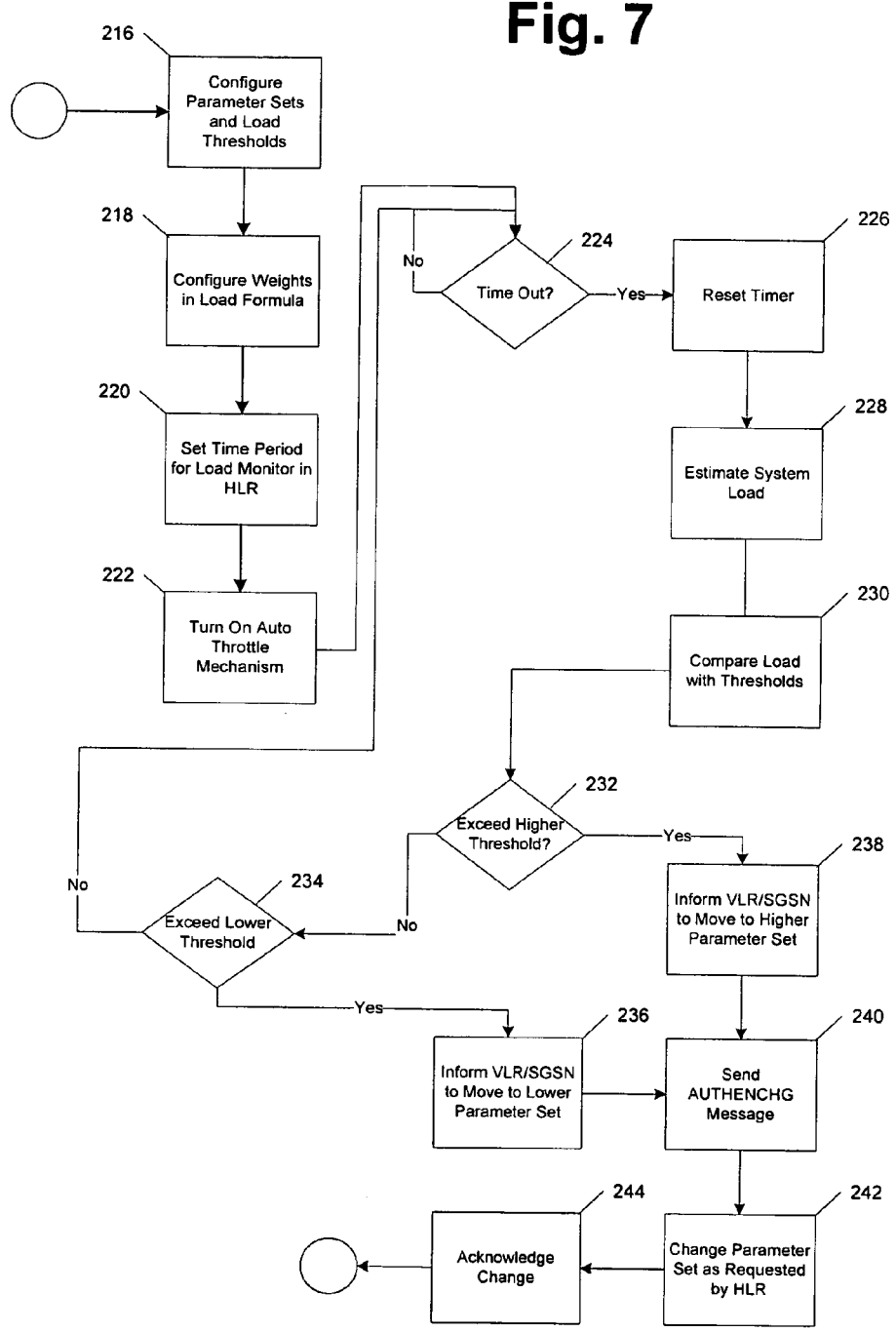
FIG. 7 is a flowchart of exemplary processes performed in accordance with another embodiment of present invention.

Referring to FIGS. 5-7 and Tables 1 and 2, a second embodiment also provides sets of authentication parameters for low signaling traffic, medium signaling traffic, and high signaling traffic. In this embodiment, the HLR 112 monitors traffic events from VLRs 114 (in the MSC 108/VLR 114, call sever, etc.) and SGSNs 132 to control the authentication parameters. The HLR 112 uses thresholds to determine signaling traffic load status to direct VLRs 114 and SGSNs 132 to change an authentication parameter set according to signaling traffic load.

For the HLR 112 and VLR 114 or SGSN 132 to exchange info for updating authentication parameter sets, a pair of MAP messages, such as those shown in FIGS. 5 and 6 may be used for the interfaces between HLR 112/VLR 114 and HLR 112/SGSN 132. Thus, the second embodiment may require a change to conventional GSM networks 100 to implement the messaging protocol.

The message components from HLR 112 (FIG. 5) include the node (VLR 114 and SGSN 132) identity, instruction identity, and identity for the authentication parameter. It is preferable for HLR 112 to direct each VLR 114 or SGSN 132 individually. After a VLR 114 or SGSN 132 receives the direction from the serving HLR 112, the VLR 114 or SGSN 132 makes the new set of authentication parameters effective in a predefined time. The acknowledge message (FIG. 6) components from VLR 114 and SGSN 132 to the HLR 112 include HLR 112 identity and instruction identity that indicates success or failure and an error code associated with the parameter set.

Turning to FIG. 7, there is a flow chart of the exemplary processes performed by this embodiment. Initially, the parameter sets and load thresholds are configured (216). In non-busy hours, the authentication parameters may be set to include more traffic events and to be invoked more frequently. In busy hours, the authentication parameters may be set to include less traffic events and to be invoked less frequently. When the signaling load on HLR 112 is very high, the authentication parameters may be set to include the least traffic events and to be invoked the least frequently.

Weights are configured for a load formula, which is used to determine a signaling load (218). Next, a time period for monitoring the signaling load is set in the HLR 112 (220). The dynamic automatic authentication configuration mechanism to adjust parameter sets is then enabled (222). A timer is started, that after a time-out period, is reset and a snapshot of the signaling load is taken (224-228).

To assess the signaling traffic load, the HLR 112 may weigh events impacting capacity (228). For example:

Signaling load=weight1*Average CPU Utilization+weight2*SRI causing PRN+weight3*Location Update Requests+weight4*LU Requests (No ISD 3GPP SC)+weight5*CISS Requests+weight6*SMS Routing Requests+weight 7*Report SM Delivery Requests+weight8*Ready For SM Requests+weight9*USSD Requests and Indications+weight10*Standby Requests+weight10*Send Routing Info for LCS Requests+weight 11*Message Diversions+weight12*ATSI Requests+weight13*ATMod Requests.

The above traffic events are understood by those of ordinary skill in the art and it is appreciated that fewer or greater numbers of events may be weighted to arrive at a signaling load. The weights may be determined through empirical tests, analysis, etc., and adjusted to compensate for actual performance.

A set of thresholds is used to assess low signaling traffic, medium signaling traffic, high signaling traffic, and very high signaling traffic, to which the signaling load is compared (230). If the signaling load exceeds a higher threshold (232), the VLR 114/SGSN 132 is informed that it should move to a higher load parameter set (238). The VLR 114/SGSN 132 is sent a message, such as that in FIG. 5, and the parameters are changed to the appropriate higher Parameter Set (240, 242). A timer may be used in the VLR 114/SGSN 132 to make the new authentication Parameter Set effective. The VLR 114/SGSN 132 acknowledges the change by returning an acknowledgement such as that in FIG. 6 (244).

If at 232 the signaling traffic does not exceed the higher threshold, it is determined if it exceeds (i.e., is lower than) a lower threshold (234). If so, the VLR 114/SGSN 132 is informed that it should move to a lower load parameter set (236). The VLR 114/SGSN 132 is sent a message and the parameters are changed to the appropriate lower Parameter Set (240, 242). A timer may be used in the VLR 114/SGSN 132 to make the new authentication Parameter Set effective. The VLR 114/SGSN 132 acknowledges the change by returning an acknowledgement message (244).

In addition to applying the various Parameter Sets based on signaling load, the Parameter Sets may be applied to classes of service. For example, a customer may require a high level of authentication for mobile devices associated with the customer. Accordingly, Parameter Set 1, for example, may be applied to all of the customer's mobile devices at all times, whereas, other customers may have Parameter Set 3 applied to their devices due to signaling traffic, etc. Implementing this alternative will ensure that customer's devices are authenticated prior and during use to further secure the data being communicated thereby, thus allaying fears of unauthorized use or tampering.

Figure 8:
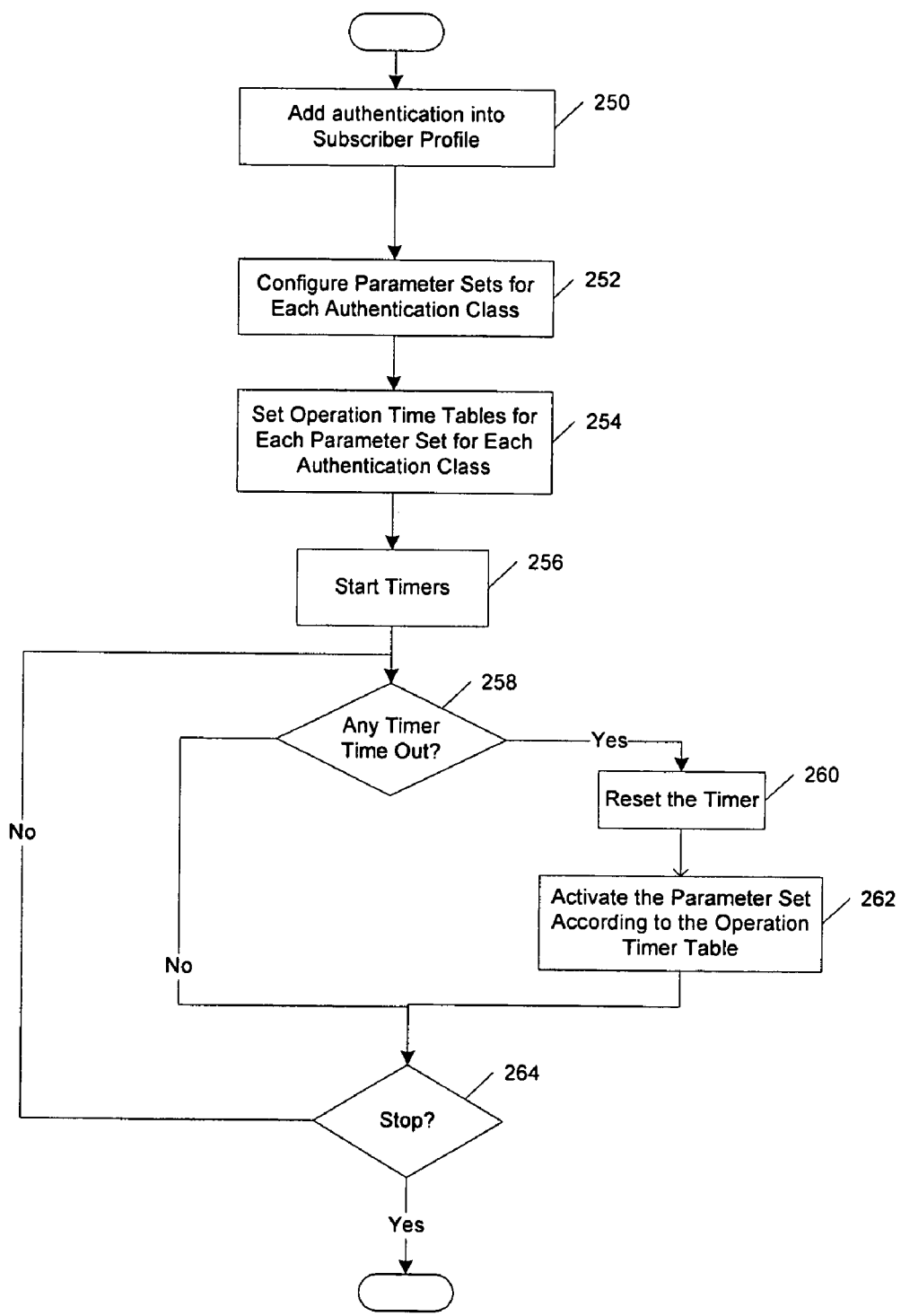
FIGS. 8 and 9 are flowcharts of exemplary processes performed to implement authentication classes to provide classes of service.
Figure 9:
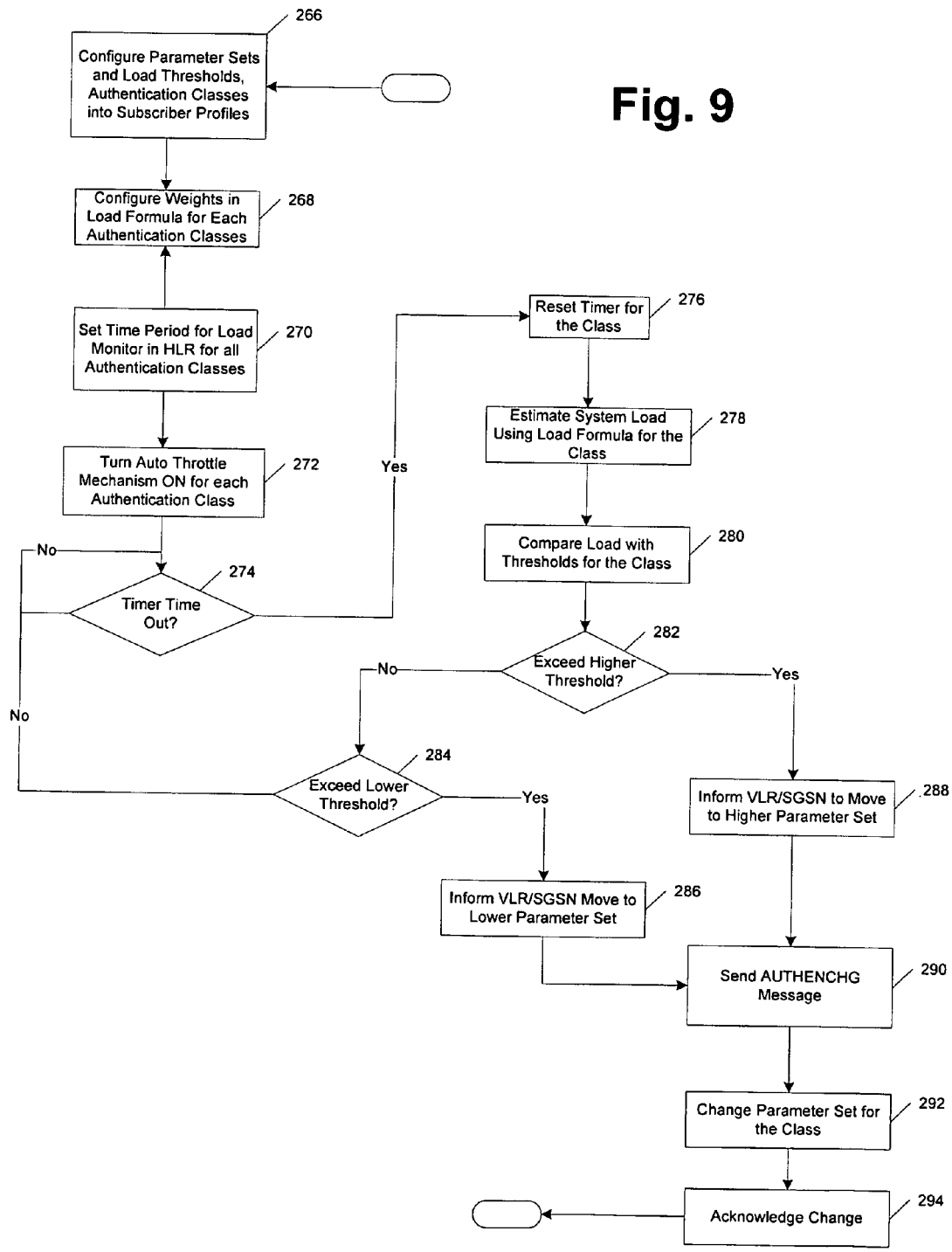

FIGS. 8 and 9 and an exemplary Time Table 2 illustrate classes of service in accordance with the present invention. Referring to FIG. 8, a first implementation adds the sets of authentication parameters for low signaling traffic, medium signaling traffic and high signaling traffic (Tables 1 and 2) to a subscriber profile (250). Time Table 2 is predefined for each VLR 114 and SGSN 132 where the sets are active and for each authentication class (252, 254).

TIME TABLE 2

|  | Time 1 (Off Peak 1) | Time 2 (Peak 1) | Time 3 (Off Peak 2) | Time 4 (Peak 2) |
| --- | --- | --- | --- | --- |
| Time Variable | (8:00 pm-6:00 am) | (6:00 am-10:00 am) | (10:00 am-3:00 pm) | (3:00 pm-8:00 pm) |
| AuthClass1 | Parameter Set 1 | Parameter Set 1 | Parameter Set 1 | Parameter Set 1 |
| AuthClass2 | Parameter Set 2 | Parameter Set 2 | Parameter Set 2 | Parameter Set 2 |
| AuthClass3 | Parameter Set 3 | Parameter Set 3 | Parameter Set 3 | Parameter Set 3 |
| AuthClass4 | Parameter Set 1 | Parameter Set 2 | Parameter Set 1 | Parameter Set 2 |
| AuthClass5 | Parameter Set 1 | Parameter Set 3 | Parameter Set 1 | Parameter Set 3 |
| AuthClass6 | Parameter Set 2 | Parameter Set 3 | Parameter Set 2 | Parameter Set 3 |

A timer is started for each authentication class (256) and after any time for any authentication class times-out (258) it is reset (260) and the appropriate parameter set for the time period and authentication class is activated (262). As such, the set of parameters is automatically activated when its operation time arrives. Next, it is determined if the process should stop (264). If so, the process stops; otherwise it returns to (258) to wait for a timer to time-out.

Turning to FIG. 9, there is a flow chart of the exemplary processes performed by another class of service embodiment. Initially, the parameter sets, load thresholds and authentication classes are configured (266). Weights are configured for a load formula for each authentication class, which is used to determine a signaling load (268). Next, a time period for monitoring the signaling load is set in the HLR 112 (270). The automatic mechanism to adjust parameter sets for authentication classes is then enabled (272). A timer is started for each monitored authentication class. After a time-out period for each class, each timer is reset and a snapshot of the signaling load is taken (274, 276).

To assess the signaling traffic load, the HLR 112 may weigh events impacting capacity (278) using weights such as those defined above with regard to FIG. 7. A set of thresholds is used to assess low signaling traffic, medium signaling traffic, high signaling traffic, and very high signaling traffic, to which the signaling load for the authentication class is compared (280). If the signaling load exceeds a higher threshold (282), the VLR 114/SGSN 132 is informed that it should move to a higher load parameter set (288). The VLR 114/SGSN 132 is sent a message, such as that in FIG. 5, and the parameters are changed to the appropriate higher Parameter Set (290, 292). A timer may be used in the VLR 114/SGSN 132 to make the new authentication Parameter Set effective. The VLR 114/SGSN 132 acknowledges the change by returning an acknowledgement such as that in FIG. 6 (294).

If at 282 the signaling traffic does not exceed the higher threshold, it is determined if it exceeds (i.e., is lower than) a lower threshold (284). If so, the VLR 114/SGSN 132 is informed that it should move to a lower load parameter set (286). The VLR 114/SGSN 132 is sent a message and the parameters are changed to the appropriate lower Parameter Set (290, 292). A timer may be used in the VLR 114/SGSN 132 to make the new authentication Parameter Set effective. The VLR 114/SGSN 132 acknowledges the change by returning an acknowledgement message (294).

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment (e.g., GSM/GPRS/UMTS, etc.), whether wired or wireless, and may be applied to any number of such devices connected via a communications network and interacting across the network. Therefore, the present invention should not be limited to any single embodiment, but rather should be construed in breadth and scope in accordance with the appended claims.

What is claimed:

1. A method, comprising:

authenticating a communications device by a network element configured with at least one authentication parameter, said at least one authentication parameter being selected at least partially based on a current time and a plurality of predetermined associations between segments of time and corresponding amounts of signaling traffic;

wherein said communications device is authenticated at least partially based on an event counter threshold associated with a time segment during which a traffic event occurs, wherein an individual time segment is associated with a corresponding event counter threshold, a first time segment being associated with low signaling traffic and an event counter threshold corresponding to a first number of traffic events; and wherein a second time segment is associated with a higher amount of signaling traffic and an event counter threshold corresponding to a second number of traffic events less than said first number of traffic events, wherein said traffic events comprise: CPU Utilization, SRI causing PRN, Location Update Requests, CISS Requests, SMS Routing Requests, Report SM Delivery Requests, Ready For SM Request, USSD Requests and Indications Standby Requests, Send Routing Info for LCS Requests, Message Diversions, ATSI Requests and ATMod Requests.

2. The method of claim 1, wherein said segments of time include a time segment associated with low signaling traffic, a time segment associated with medium signaling traffic and a time segment associated with high signaling traffic.

3. The method of claim 1,
wherein the at least one authentication parameter is associated with at least one of a Visitor Location Register (VLR) or a Serving GPRS Support Node (SGSN).

4. A method comprising:
authenticating a communications device by a network at least partially based on an estimate of a signaling traffic load on said network;
communicating a message from a database to a network element attempting to authenticate said communications device with said network to inform said network element of authentication parameters selected at least partially based on said estimate; and
determining said signaling traffic load based on a weighted sum of traffic events,
wherein said network comprises a cellular telecommunications network and said traffic events comprise: CPU Utilization, SRI causing PRN, Location UDdate Requests, CISS Requests, SMS Routing Requests, Report SM Delivery Requests, Ready For SM Request, USSD Requests and Indications, Standby Requests Send Routing Info for LCS Requests, Message Diversions, ATSI Requests and ATMod Requests.

5. The method of claim 4, wherein said authenticating includes selecting authentication parameters from individual sets of authentication parameters for low signaling traffic, medium signaling traffic, and high signaling traffic, said selecting being at least partially based on said estimate.

6. The method of claim 4, wherein said message includes flags to activate or deactivate said individual sets of authentication parameters.

7. The method of claim 6, further comprising communicating an acknowledgement from the network element to said database.

8. The method of claim 4, further comprising comparing said signaling traffic load to at least one threshold to determine which of said sets of authentication parameters to select.

9. The method of claim 4, further comprising:
providing said sets of authentication parameters to said network; and
applying said sets of authentication parameters to at least one of a Visitor Location Register (VLR) or a Serving GPRS Support Node (SGSN).

10. The method of claim 4, further comprising:
applying said sets of authentication parameters differently to each defined class of service within said network.

11. A cellular telecommunications network, comprising:
at least one of a visitor location register (VLR) and a Serving GPRS Support Node (SGSN);
a home location register (HLR) configured to monitor traffic events in the cellular telecommunications network and to select said selected set from a plurality of sets of authentication parameters at least partially based on a signaling load and predetermined signaling loads,
wherein said at least one of the VLR and SGSN is configured to apply a selected set of authentication parameters selected at least partially based on a current time and a plurality of predetermined associations between segments of time and corresponding amounts of signaling traffic;
wherein said signaling load is based on a weighted sum of traffic events, said traffic events of the weighted sum comprising: CPU Utilization, SRI causing PRN, Location Update Requests, CISS Requests, SMS Routing Requests, Report SM Delivery Requests, Ready For SM Request, USSD Requests and Indications, Standby Requests, Send Routing Info for LCS Requests, Message Diversions, ATSI Requests and ATMod Requests.

12. The network of claim 11, wherein said selected set is selected based on a time of day.

13. The network of claim 11, wherein said selected set is selected based on a comparison of said signaling load to a threshold.

14. The network of claim 13, wherein a message is communicated to said at least one of said VLR and said SGSN to apply said selected set.

15. The network of claim 11, wherein said selected set of authentication parameters is selected based on class of service.

16. The method of claim 4, wherein the authentication includes applying authentication parameters based on an authentication configuration profile and a time schedule for selecting authentication configurations.

* * * * *

UNITED STATES PATENT AND TRADEMARK OFFICE
CERTIFICATE OF CORRECTION

PATENT NO. : 7,519,354 B2 Page 1 of 1
APPLICATION NO. : 11/300695
DATED : April 14, 2009
INVENTOR(S) : Bo Lee et al.

It is certified that error appears in the above-identified patent and that said Letters Patent is hereby corrected as shown below:

Col. 11, line 18, claim 4, please replace "UDdate" with --Update--

Signed and Sealed this

Second Day of June, 2009

JOHN DOLL
*Acting Director of the United States Patent and Trademark Office*